United States Patent

[11] 3,559,971

| [72] | Inventor | Lawrence J. Rogers<br>Maple Heights, Ohio |
|---|---|---|
| [21] | Appl. No. | 714,178 |
| [22] | Filed | Mar. 19, 1968 |
| [45] | Patented | Feb. 2, 1971 |
| [73] | Assignee | Air Products and Chemicals, Inc.,<br>Allentown, Pa.<br>a corporation of Delaware, by mesne<br>assignment |

[54] CONTOUR CUTTING DEVICE
10 Claims, 7 Drawing Figs.

| [52] | U.S. Cl. | 266/23 |
|---|---|---|
| [51] | Int. Cl. | B23k 7/10 |
| [50] | Field of Search | 266/23E;<br>104/119; 105/(Inquired); 249/219 |

[56] References Cited
UNITED STATES PATENTS

| 2,026,472 | 12/1935 | Hromek | 249/219X |
|---|---|---|---|
| 3,358,617 | 12/1967 | Erickson | 105/376 |
| 3,423,081 | 1/1969 | Schwartz | 266/23 |

Primary Examiner—Frank T. Yost
Attorneys—Ronald B. Sherer, James C. Simmons and Max B. Klevit ABSTRACT: There is provided a contour cutting device wherein a torch follows a path traced by a photosensitive head over a preselected pattern. This device includes a three point guide assembly for movement of the torch in one direction and a tension adjusting arrangement for a chain for movement of the torch in a second direction.

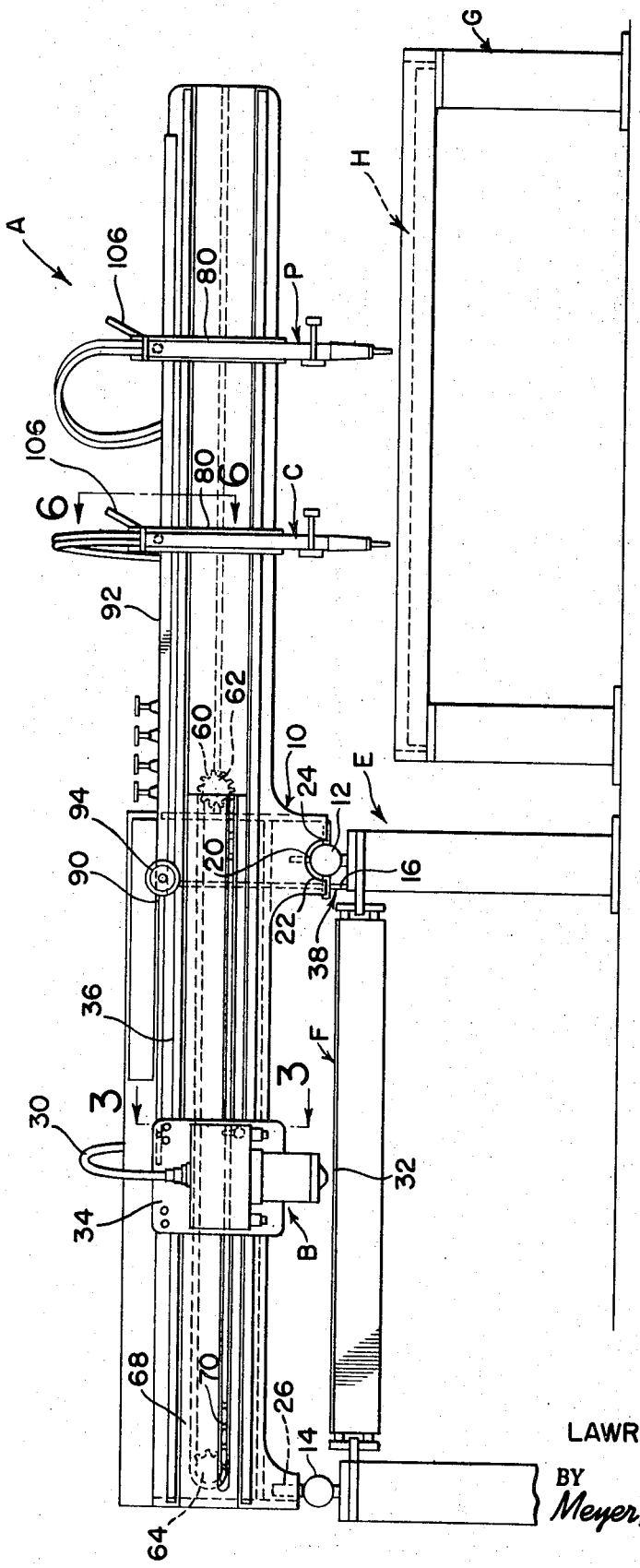

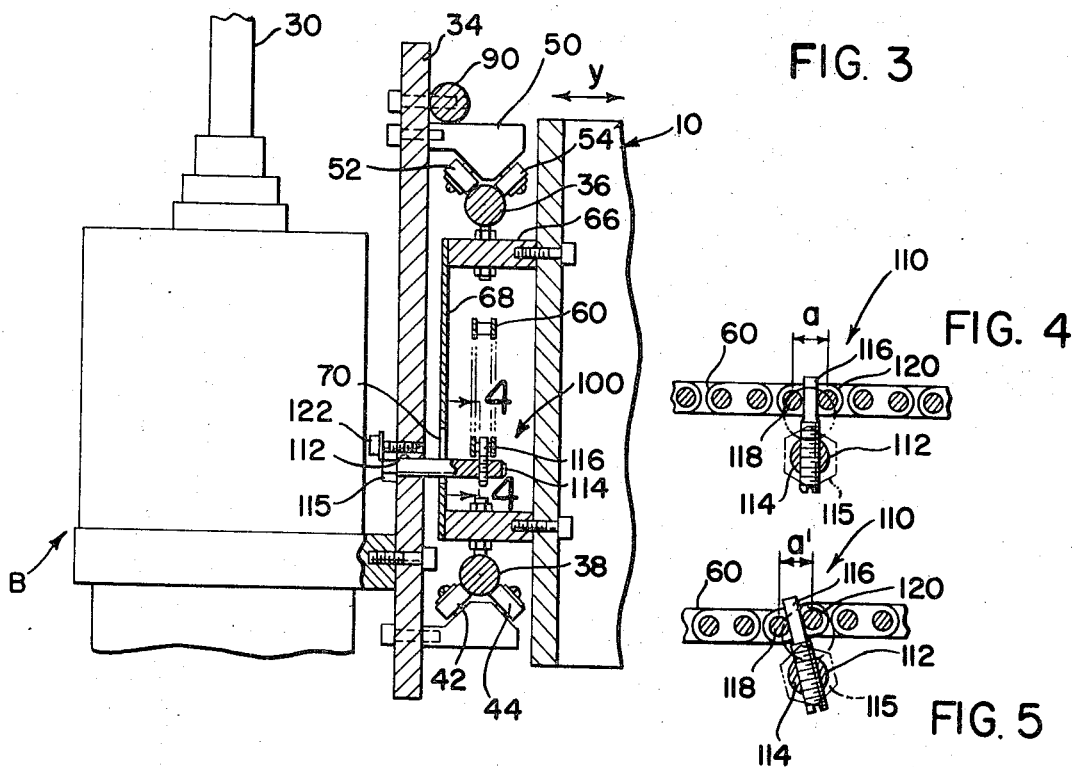
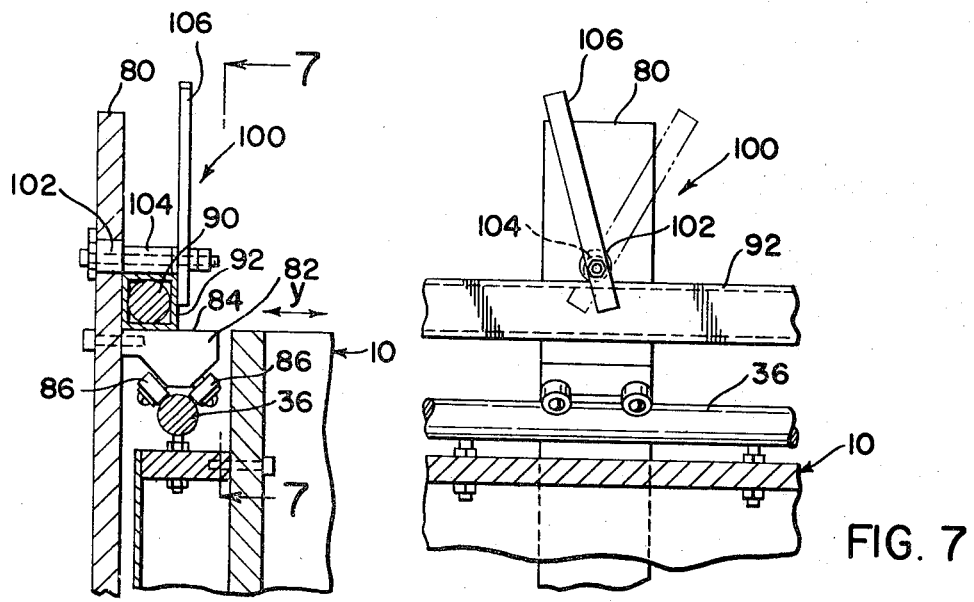
INVENTOR
LAWRENCE J. ROGERS
BY
Meyer, Tilberry & Body
ATTORNEYS

CONTOUR CUTTING DEVICE

This invention pertains to the art of cutting generally flat workpieces and more particularly to a contour cutting device for cutting such workpieces.

The invention is particularly applicable for cutting a number of preselected contours from a flat metal workpiece by a plurality of cutting torches, such as oxyacetylene, plasma or laser torches, and it will be described with particular reference thereto, however, it will be appreciated that the invention has much broader applications and may be used for cutting various flat workpieces with a single torch or multiple movable cutting torches.

It has become quite common to cut given shapes from flat metal workpieces by a device which moves a cutting torch in accordance with a selected pattern which may be represented by a drawing or facsimile of the shape itself or by an appropriate automated program of the shape. The present invention relates to a device of the type that uses a drawing of the shape to control the movement of a cutting torch during its cutting operation. These devices generally include a frame for carrying both a follower and a torch with the follower and torch being moved in unison. Consequently, movement of the follower along the drawing moves the torch in a like manner; and, thus, cuts the desired shape into a workpiece supported opposite the cutting torch. At one time, oxyacetylene torches were used for this type of cutting operation, and the contour cutting devices were, in general, somewhat crude machines. Such machines could move the cutting torch in approximately the desired path because the oxyacetylene torches cut relatively slowly, i.e. not more than 15—30 inches per minute. Of course, these oxyacetylene cutting devices or machines could not provide an accurate cut at all times; therefore, subsequent grinding and shaping was usually needed when the shape of the workpiece was critical. Also, it has been found that these devices cannot be operated at high speeds, approaching 200 inches per minute without prohibited vibrations and extreme inaccuracies.

In recent years plasma and laser torches have been developed with capabilities of economically cutting flat metal workpieces. These torches can cut many metals at a speed in the range of 200—400 inches per minute. With the advent of these high speed torches, it became immediately apparent that the crude contour cutting devices, or machines, used with oxyacetylene torches could not control the movement of torches cutting at the rate made possible by the plasma and laser torches. Accordingly, much work has been devoted to the development of contour cutting devices which can cut preselected shapes at high speeds with the necessary accuracy and uniformity.

During development of these high speed cutting devices, certain factors other than cutting speed were considered to be important in any improved cutting device. It was essential that these improved cutting devices be more accurate than the older oxyacetylene devices so that subsequent shaping of the workpiece was minimized, waste was reduced, and increased cutting tolerances were not needed. These factors are even more pronounced when expensive alloy sheets are being cut by the contour cutting device. Waste and scrap of these expensive alloys may result in substantial increases in the overall cost of the cutting operation. The present invention relates to a contour cutting device which includes various features that combine to produce a device optimizing the above-mentioned characteristics, including increased accuracy without excessive vibrations and simplified adjustment.

The present invention relates to an improvement in a contour cutting device having a scanning head movable along a preselected pattern with the movement of the scanning head being divided into first and second generally orthogonal components. In this type of device, there is provided a frame mounted to move in a $y$ direction, and a torch mounted on the frame to move in an $x$ direction. This type of device includes means for moving the frame in the $y$ direction in response to the first component of movement of the scanner, means for moving the torch on the frame in the $x$ direction in response to the second component of movement of the scanner, and means for mounting a workpiece to be cut in a fixed position adjacent and below the torch whereby the workpiece is cut in accordance with the movement of the scanning head.

In accordance with one aspect of the present invention, there is provided an arrangement for mounting the movable frame of this contour cutting device. This arrangement includes two rails extending in the $y$ direction, with supporting structures engaging one of these rails. These supporting structures include three separate rollers engaging different portions of the rail. In this manner, the frame is supported on the opposite rail by supporting structures having only a single roller. In this manner, a more accurate control is obtained over the movement of the frame in the $y$ direction. As an adjunct, the rails are cylindrical and the rolls are disposed in such a position to provide essentially point contact between the rolls and the rails. With such point contact, foreign matter accumulated on the rails does not prevent smooth movement of the frame along the rails.

In accordance with another aspect of the present invention, a chain used to move the torch in the $x$ direction is provided with an adjusting means including a rotatable member and an extending pin. The pin extends into the chain so that rotation of the member increases the tension of the chain to eliminate slack which can cause inaccuracies in the device. This adjusting means requires a relatively small inactive length of chain; therefore, essentially the complete length of the chain can be used in moving the torch in the $x$ direction.

In accordance with still a further aspect of the present invention, there is provided an improvement in the arrangement for connecting the torches onto the chain for movement in the $x$ direction. A rodlike member connected to the chain is telescopingly received within a tubelike member connected to the torch mounting plate. An easily operated cam member is affixed onto torch mounting plate and above the tubelike member so that movement of the cam member into a first position frictionally holds the rodlike member with respect to the torch mounting plate. Movement of the cam member into a second position releases this frictional engagement to allow easy adjustment of the cutting torch and mounting plate with respect to the tubelike member and the operating chain.

By incorporating the inventive concepts discussed above, it has been found that a relatively compact, accurate, high-speed contour-cutting machine can be produced at a relatively low cost.

The primary object of the present invention is the provision of a contour-cutting device of the type used in cutting flat metal workpieces into desired shapes, which device allows accurate high speed operation, easy adjustment, and low maintenance.

Another object of the present invention is the provision of a contour-cutting device of the type used in cutting flat metal workpieces into desired shapes, which device reduces vibrations and disturbances in moving the cutting torch at high speeds along a selected contour.

Yet another object of the present invention is the provision of a contour-cutting device as defined above which device includes a movable frame having a low friction, low vibration movable mounting arrangement.

Another object of the present invention is the provision of a contour-cutting device as defined above which device includes an arrangement for adjusting the operating chain without requiring a large length of chain.

Still another object of the present invention is the provision of a contour-cutting device as defined above which device includes a cam arrangement for selectively locking the torch onto its moving structure.

These and other objects and advantages will become apparent from the following description used to illustrate the preferred embodiment of the invention as read in connection with accompanying drawings in which:

FIG. 2 is a front elevational view illustrating, somewhat schematically, the embodiment of the invention shown in FIG. 1;

FIG. 3 is an enlarged view taken generally along line 3-3 of FIG. 2.

FIG. 4 and 5 are enlarged partial views taken generally along line 4-4 of FIG. 3;

FIG. 6 is an enlarged partial view taken generally along line 6-6 of FIG. 2; and FIG. 7 is a partial view taken generally along line 7-7 of FIG. 6.

Figure 1:
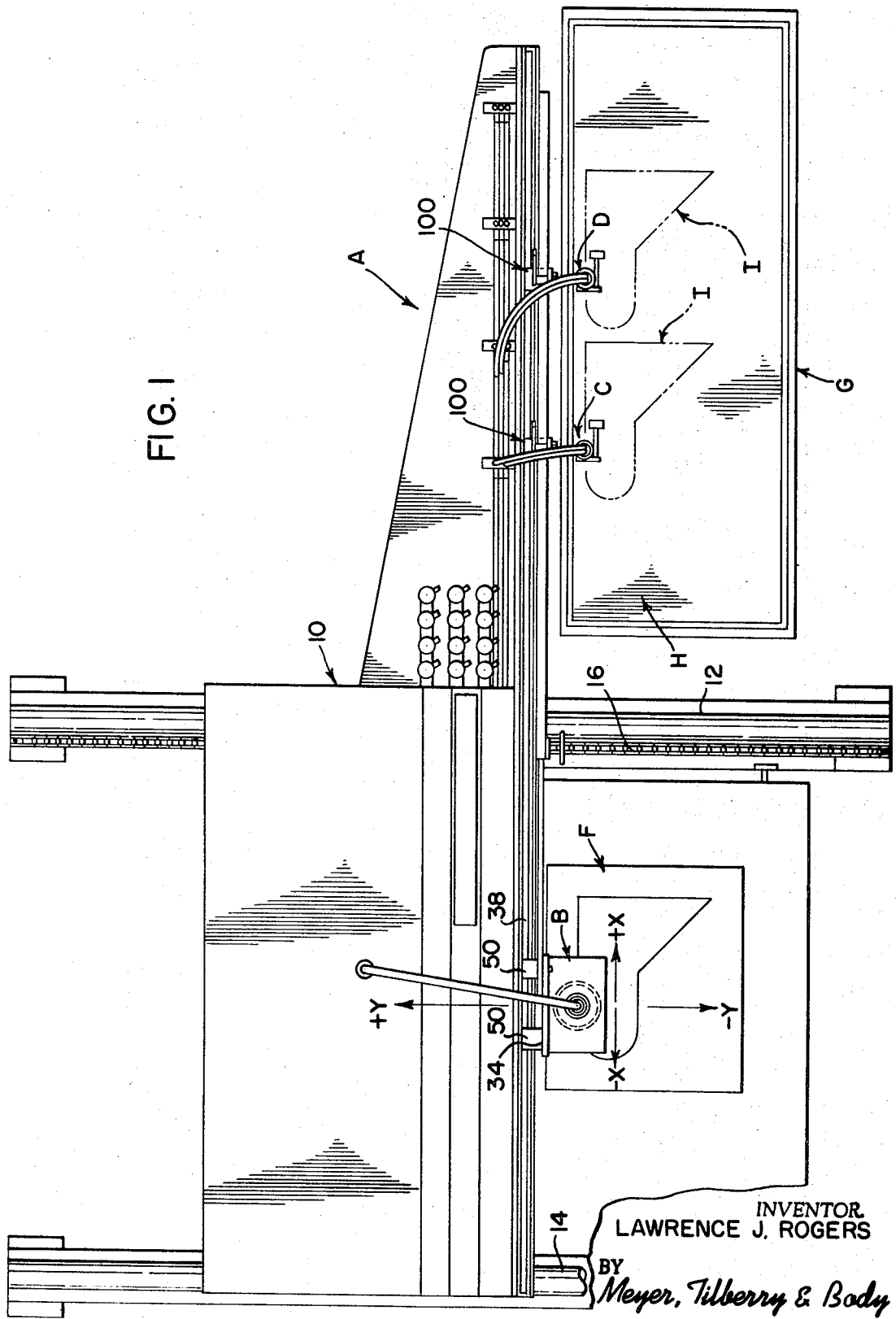
FIG. 1 is a top plan view illustrating, somewhat schematically, the preferred embodiment of the invention.

Referring now to the drawings wherein the showings are for the purpose of illustrating the preferred embodiment of the invention only and not for the purpose of limiting same, FIGS. 1 and 2 show a contour cutting device A, constructed in accordance with the present invention. This device includes a photosensitive scanning head B and two spaced cutting torches C, D. The device A is supported on a structure E onto which is placed an appropriate and preselected pattern F. Below the torches there is disposed a workpiece supporting table G carrying a flat metal workpiece H from which two identical pieces I are to be cut by torches C, D.

Referring now in more detail to the contour-cutting device 10, it includes a frame 10 reciprocated in a direction y on a pair of parallel, spaced cylindrical rails 12, 14. A chain 16 generally coextensive with rail 12 drives the frame 10 in the y direction by a drive mechanism which is somewhat conventional. This mechanism includes a sprocket rotatably mounted on frame 10 and engaging chain 16 so that rotation of the sprocket drives the frame 10 in the y direction. Details of this particular drive mechanism have been omitted for the purpose of simplicity.

To support the frame 10 on rails 12, 14 there are provided adjacent rail 12 at least two downwardly extending supporting units, one of which is illustrated in FIG. 2. These supporting units each include a cylindrical load-bearing roll 20 rotatably mounted about an axis transverse to rail 12 and above the same. These units also include spaced guide rolls 22, 24 rotatably mounted on generally vertical axis so that the guide rolls 22, 24 contact opposite sides of rail 12. By providing the three rolls, 20, 22 and 24, in two spaced positions, frame 10 can move only in the y direction. To provide outboard support for frame 10, cylindrical load-bearing rolls 26, only one of which is shown in FIG. 2, are provided above the rail 14. Again, these load-bearing rolls are mounted on axes above and transverse to rail 14. Since the various rolls and the rails are cylindrical and the rolls are on transversely extending axes, substantially point contact is created between the rolls and the rails. This provides a high pressure at the point contact so that any foreign substance or obstructions on the rails will not affect the smooth movement of frame 10 in the y direction. Any obstruction will be pushed aside by the various rolls. This provides a highly efficient and smoothly operating guiding system for the frame 10 as it moves in the y direction.

Referring now more particularly to the scanning head B, as primarily shown in FIG. 3, this head includes a control embryo line 30 through which electrical signals are directed from the scanning head to the various drive units. One of these drive units is the motor which drives the frame 10 in the y direction by chain 16. The other motor moves the torches C and D in the x direction, in a manner to be explained later. Head B also includes a downwardly protruding scanning tip 32 which is photosensitive so that the scanning head tends to follow the pattern F. The head follows the pattern by driving the frame; and, thus, the torches, in a y direction if needed or the head and torches in the x direction if required. The operation of the scanning head is well known in the art. Head B is supported on plate 34 which, in turn, is supported on parallel rails 36, 38 by a lower support bracket 40 having rolls 42, 44 and an upper support bracket 50 having rolls 52, 54. The operation of the head is clearly evident from this explanation and the drawings.

To cause movement of the head and torches in the x direction, a chain 60 is entrained around spaced sprockets 62, 64 journaled within frame 10. Sprocket 64 is driven in response to a signal from the embryo line 30 to rotate the chain in the appropriate direction to cause movement in an x direction of the head B and torches C and D, in unison. Chain 60 is located within housing 66 having a front cover 68 with a slot 70 extending generally in the x direction. To move the torches C and D with the scanning head B, plate 34 supporting the scanning head is coupled onto a plate 80 for supporting the torches. As shown in FIG. 6, the plate 80 is supported on rails 36 and 38 (the latter not shown in FIG. 6) in a manner similar to the support of plate 34 on these same rails. A bracket 82 having an upper friction surface 84 and lower rollers 86 engage the parallel support rails. A lower bracket is also provided to engage rail 38. A rod 90 bolted onto plate 34 is telescopingly received within a tube 92 and is locked into engagement with this tube by an appropriate locking device 94, shown in FIG. 2.

As so far explained, as plate 34 is moved, the tube 92 moves. In order to couple plate 80 onto tube 92 there is provided, in accordance with the present invention, a cam lock arrangement 100 having a rotatable member 102, an eccentric portion 104 and an operating handle 106. By turning the handle 106 the eccentric portion 104 clamps the tube 92 against the upper friction surface 84 of bracket 82. This fixedly secures the torch supporting plate 80 with respect to the tube and, in turn, with respect to the scanning head B. To adjust the position of the torches, handle 106 is shifted to release tube 92 from its frictional engagement with surface 84. Thereafter the plate 80 and the torch carried thereby is quickly and easily adjusted along the tube. After the proper position has been obtained, handle 106 is moved into a position whereby the eccentric portion 104 again clamps the tube 92 against the friction surface 84. This provides a simple arrangement for adjusting the two torches with respect to the scanning head. This adjustment basically depends upon the size of the pieces being cut from the workpiece H and their positions on workpiece H.

Referring now to FIGS. 3, 4 and 5, plate 34 is coupled onto the chain 60 by a device 110 which is also utilized for adjusting the tension of the chain. Device 110 includes a shaft 112 extending through plate 34 and having a shank 114 and a head 115. At the extreme end of shank 114 there is provided a threaded pin 116 which extends between spaced studs 118, 120 of chain 60. As shown in FIG. 4, the spacing between studs 118, 120 is normally $a$. By rotating the shaft 112 this distance is decreased to $a'$ which is shorter than $a$. In this manner, the tension on the chain is increased without requiring a complicated or separate mechanism as previously used. These prior devices were inserted within the chain itself and eliminated a substantial length of useful chain. These prior adjusting mechanisms could not extend to the vicinity of the sprockets and seriously shortened the actual useful length of the chain which is used to move the torches in the x direction. A locking bolt 122 secures the bolt 112 in various adjusted positions.

As chain 60 is moved by the motor driving sprocket 64 in accordance with the desired movement of head B, the shaft 112 also forms a coupling between the chain and the plate 34. This coupling allows movement of the plate 34 and simultaneous movement of the plates 80 supporting the various torches.

By incorporating various features described in this application, an accurate and relatively inexpensive contour-cutting device is provided. It is appreciated that this invention has been described in connection with certain structural embodiments; however, these embodiments may be modified without departing from the intended spirit and scope of the present invention, as defined in the appended claims.

I claim:

1. In a contour-cutting device having a scanning head movable along a preselected pattern, the movement of said scanning head being divided into first and second generally orthogonal components, a frame movable in a y direction, a torch having a cutting nozzle, said torch being mounted on said frame and movable on said frame in an x direction, means for moving said frame in said y direction in response to said first component, means for moving said torch on said frame in said x direction in response to said second component, and means for mounting a workpiece to be cut into a shape matching said pattern in a fixed position adjacent and below said cutting nozzle whereby said workpiece is cut in accordance with movement of said head, the improvement comprising: two parallel rails extending in said y direction and below said frame, each of said rails having upper load bearing surfaces, the first of said rails having two transversely opposed bearing surfaces, said frame having two spaced, rail engaging supporting structures, the first supporting structure comprising two roller assemblies spaced in the y direction, each roll assembly including a first load bearing roll rotatable on an axis generally transverse to said y direction, above said first rail and riding on said load bearing surface of said first rail, and two guiding rolls rotatable on axes generally vertical and on opposite sides of said first rail, said guiding rolls bearing against said opposed bearing surfaces whereby said first rail guides said frame in said y direction and the second supporting structure comprising at least one load bearing roll rotatable on an axis generally transverse to said y direction, above said second rail and riding on said loading bearing surface of said second rail.

2. The improvement as defined in claim 1 wherein said second supporting structure comprises two load-bearing rolls riding on said load-bearing surface of said second rail.

3. The improvement as defined in claim 1 wherein said first rail is generally cylindrical.

4. The improvement as defined in claim 3 wherein said first load-bearing rolls are generally cylindrical to form a substantially point contact with said first rail.

5. The improvement as defined in claim 1 wherein said rails are both cylindrical and said load-bearing rolls are generally cylindrical to form a substantially point contact with said rails.

6. In a contour-cutting device having a scanning head movable along a preselected pattern, the movement of said scanning head being divided into first and second generally orthogonal components, a frame movable in a y direction, a torch having a cutting nozzle, said torch being mounted on said frame and movable on said frame in an x direction, means for moving said frame in said y direction in response to said first component, means for moving said torch on said frame in said x direction in response to said second component, and means for mounting a workpiece to be cut into a shape matching said pattern in a fixed position adjacent and below said cutting nozzle whereby said workpiece is cut in accordance with movement of said head, said torch moving means comprises guide rails on said frame and extending in said x direction, a member carrying said torch and movable on said guide rails, a continuous chain extending in said x direction and entrained around two sprockets journaled on said frame and spaced in said x direction, motor means for rotating one of said sprockets in accordance with said second component, means for adjusting the tension of said chain, and means for coupling said chain to said torch carrying member, the improvement comprising: said adjusting means comprising a first member movable with said chain and rotatable about an axis spaced from said chain and extending in generally said y direction, a pinlike member extending from said first member and into said chain whereby rotation of said first member changes the tension of said chain and means for locking said first member in various rotated positions.

7. The improvement as defined in claim 6 wherein said pinlike member is threaded into said first member.

8. The improvement as defined in claim 6 wherein said first member has an outer locking element and said locking means engages said locking element to hold said first member in an adjusted position.

9. A contour-cutting device of claim 6 wherein said member carrying said torch includes an elongated element and means for clamping said torch carrying member onto said element, said clamping means comprising a first surface on said torch carrying member, said element extending over said surface, and cam means on said carrying member and above said element and said surface, said cam means having a first position forcing said element into frictional holding engagement with said surface and a second position releasing said holding engagement.

10. The improvement as defined in claim 9 wherein said cam means includes an extending handle for shifting said cam means between said two positions.